US011675800B2

(12) United States Patent
Desai

(10) Patent No.: US 11,675,800 B2
(45) Date of Patent: Jun. 13, 2023

(54) VERSION CONTROL AND EXECUTION ON A MOBILE DEVICE

(71) Applicant: salesforce.com, inc., San Francisco, CA (US)

(72) Inventor: Sachin Desai, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 58 days.

(21) Appl. No.: 17/247,116

(22) Filed: Nov. 30, 2020

(65) Prior Publication Data

US 2022/0171778 A1 Jun. 2, 2022

(51) Int. Cl.
G06F 7/00 (2006.01)
*G06F 16/2458* (2019.01)
*G06F 16/9035* (2019.01)
*G06F 16/23* (2019.01)

(52) U.S. Cl.
CPC ...... *G06F 16/2474* (2019.01); *G06F 16/2329* (2019.01); *G06F 16/9035* (2019.01)

(58) Field of Classification Search
CPC ............ G06F 16/2474; G06F 16/2329; G06F 16/9035; G06F 16/1873; G06F 16/219; G06F 9/44536; G06F 8/71
See application file for complete search history.

(56) References Cited

U.S. PATENT DOCUMENTS

| 4,558,413 | A | * | 12/1985 | Schmidt | G06F 8/71 |
| | | | | | 707/999.203 |
| 4,912,637 | A | * | 3/1990 | Sheedy | G06F 8/71 |
| | | | | | 707/999.203 |
| 5,428,782 | A | * | 6/1995 | White | G06F 9/466 |
| | | | | | 719/330 |
| 5,577,188 | A | | 11/1996 | Zhu | |
| 5,608,872 | A | | 3/1997 | Schwartz et al. | |
| 5,649,104 | A | | 7/1997 | Carleton et al. | |
| 5,715,450 | A | | 2/1998 | Ambrose et al. | |
| 5,761,419 | A | | 6/1998 | Schwartz et al. | |
| 5,819,038 | A | | 10/1998 | Carleton et al. | |
| 5,821,937 | A | | 10/1998 | Tonelli et al. | |
| 5,831,610 | A | | 11/1998 | Tonelli et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Mohammed R Uddin
(74) *Attorney, Agent, or Firm* — Weaver Austin Villeneuve & Sampson LLP

(57) ABSTRACT

Disclosed are some implementations of systems, apparatus, methods and computer program products for facilitating version control for a client device. A server system may select one of two or more versions of a procedure based, at least in part, on a user profile. The server system may generate a message including a procedure name of the procedure, a version identifier identifying the selected version of the procedure, a set of computer-readable instructions corresponding to the selected version of the procedure, and a client directive pertaining to storing the procedure in a database. The server system may transmit the message to a client device associated with the user.

20 Claims, 11 Drawing Sheets

(56) References Cited

U.S. PATENT DOCUMENTS

| | | | |
|---|---|---|---|
| 5,835,911 A * | 11/1998 | Nakagawa | G06F 8/65 |
| | | | 707/999.203 |
| 5,850,554 A * | 12/1998 | Carver | G06F 8/71 |
| | | | 717/162 |
| 5,873,096 A | 2/1999 | Lim et al. | |
| 5,918,159 A | 6/1999 | Fomukong et al. | |
| 5,963,953 A | 10/1999 | Cram et al. | |
| 5,966,715 A * | 10/1999 | Sweeney | G06F 21/6218 |
| | | | 707/999.203 |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,202,205 B1 * | 3/2001 | Saboff | G06F 8/443 |
| | | | 719/331 |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,401,238 B1 * | 6/2002 | Brown | G06F 8/61 |
| | | | 709/224 |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,100,111 B2 | 8/2006 | McElfresh et al. | |
| 7,100,195 B1 * | 8/2006 | Underwood | H04L 63/0823 |
| | | | 707/999.009 |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,480,907 B1 | 1/2009 | Marolia et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,751,464 B1 * | 6/2014 | Weiss | G06Q 10/10 |
| | | | 707/695 |
| 9,503,535 B2 | 11/2016 | Desai | |
| 9,778,820 B2 | 10/2017 | Desai et al. | |
| 10,146,597 B2 | 12/2018 | Pack, III et al. | |
| 10,175,873 B2 | 1/2019 | Desai | |
| 10,310,850 B2 * | 6/2019 | Duppenthaler | G06F 8/75 |
| 10,325,079 B1 * | 6/2019 | Vukich | G06F 21/629 |
| 10,855,761 B1 | 12/2020 | Jenks et al. | |
| 11,061,667 B1 * | 7/2021 | Gujarathi | H04L 67/34 |
| 2001/0044791 A1 | 11/2001 | Richter et al. | |
| 2002/0072951 A1 | 6/2002 | Lee et al. | |
| 2002/0073110 A1 * | 6/2002 | Duvillier | G06F 9/4493 |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |

(56) References Cited

U.S. PATENT DOCUMENTS

| | | |
|---|---|---|
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0210885 A1* | 10/2004 | Wang ............... G06F 8/71 717/130 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0282441 A1* | 12/2006 | Weller ............... G06Q 10/10 |
| 2007/0226272 A1 | 9/2007 | Huang et al. |
| 2007/0260607 A1* | 11/2007 | Hajdukiewicz ........ G06Q 10/06 |
| 2008/0133678 A1* | 6/2008 | Woodham ............ H04L 51/066 709/206 |
| 2008/0134165 A1* | 6/2008 | Anderson .......... H04N 21/4586 717/173 |
| 2008/0249972 A1 | 10/2008 | Dillon |
| 2009/0037393 A1 | 2/2009 | Fredricksen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0010344 A1 | 1/2011 | Sjogren |
| 2011/0218958 A1 | 9/2011 | Warshavsky et al. |
| 2011/0247051 A1 | 10/2011 | Bulumulla et al. |
| 2011/0269424 A1 | 11/2011 | Multer et al. |
| 2012/0011496 A1* | 1/2012 | Shimamura ......... G06F 9/44536 717/170 |
| 2012/0042218 A1 | 2/2012 | Cinarkaya et al. |
| 2012/0159389 A1* | 6/2012 | Keith ..................... G06Q 10/00 715/810 |
| 2012/0233137 A1 | 9/2012 | Jakobson et al. |
| 2012/0290407 A1 | 11/2012 | Hubbard et al. |
| 2013/0036200 A1* | 2/2013 | Roberts ................... H04L 67/34 709/219 |
| 2013/0093829 A1* | 4/2013 | Rosenblatt ............... H04N 7/18 434/365 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0007084 A1 | 1/2014 | Ding |
| 2014/0026045 A1* | 1/2014 | Andres ................ G06Q 10/101 715/705 |
| 2014/0101096 A1 | 4/2014 | Pfeifle et al. |
| 2014/0237465 A1* | 8/2014 | Lin ........................... G06F 8/65 717/173 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0378454 A1* | 12/2016 | Nekrestyanov ........... G06F 8/65 717/170 |
| 2018/0025042 A1 | 1/2018 | Fischer et al. |
| 2018/0121322 A1* | 5/2018 | Reyes ................. G06F 11/3692 |
| 2018/0276559 A1 | 9/2018 | Kodali et al. |
| 2019/0155598 A1* | 5/2019 | Bainville ................ G06F 8/658 |
| 2019/0251198 A1 | 8/2019 | Shamsutdinov |
| 2019/0253476 A1 | 8/2019 | Lee et al. |
| 2020/0162462 A1 | 5/2020 | Zayats et al. |
| 2020/0194004 A1* | 6/2020 | Bates ..................... H04L 67/125 |
| 2020/0409690 A1* | 12/2020 | Rouland ................ G06F 8/654 |
| 2021/0382708 A1* | 12/2021 | Sagal ........................ G06F 8/71 |
| 2021/0392142 A1* | 12/2021 | Stephens ............... H04L 63/105 |
| 2022/0075782 A1 | 3/2022 | Hines et al. |
| 2022/0164336 A1 | 5/2022 | Desai |

OTHER PUBLICATIONS

U.S. Appl. No. 17/247,067, filed Nov. 25, 2020 Desai.
U.S. Office Action dated Nov. 18, 2021 issued in U.S. Appl. No. 17/247,067.
U.S. Final Office Action dated Apr. 21, 2022 in U.S. Appl. No. 17/247,067.
U.S. Non-Final office Action dated Sep. 26, 2022 in U.S. Appl. No. 17/247,067.

\* cited by examiner

| Procedure name | Active Version |
|---|---|
| Proc1 | 1 |
| Proc2 | 1 |

*Figure 3B*

VERSION CONTROL AND EXECUTION ON A MOBILE DEVICE

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with implementing version control of code executed on client devices. More specifically, this patent document discloses techniques for controlling the versions of procedures that are stored at client devices and executed by client devices.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with systems such as social networking systems, electronic mail (email) systems, and instant messaging systems, by way of example, in a cloud computing environment.

An organization may provide a variety of services to users via an organization's website. To ensure that data remains secure, users are often assigned individual permissions that govern the data that they can access. Automated processes typically apply the individual permissions of users to prevent organizational data from being compromised.

When a user accesses data via a client device, the data that is retrieved may already be stored locally on the client device. In the event the data is not stored locally on the client device, the data may be retrieved from a server and persisted to a local data store. The data can then be rendered via a display by the client device.

BRIEF DESCRIPTION OF THE DRAWINGS

The included drawings are for illustrative purposes and serve only to provide examples of possible structures and operations for the disclosed systems, apparatus, methods and computer program products for implementing version control for client devices. These drawings in no way limit any changes in form and detail that may be made by one skilled in the art without departing from the spirit and scope of the disclosed implementations.

FIG. 3B shows an example of a database table 350 configured to track active versions of procedures at a client device, in accordance with some implementations.

DETAILED DESCRIPTION

Figure 1:
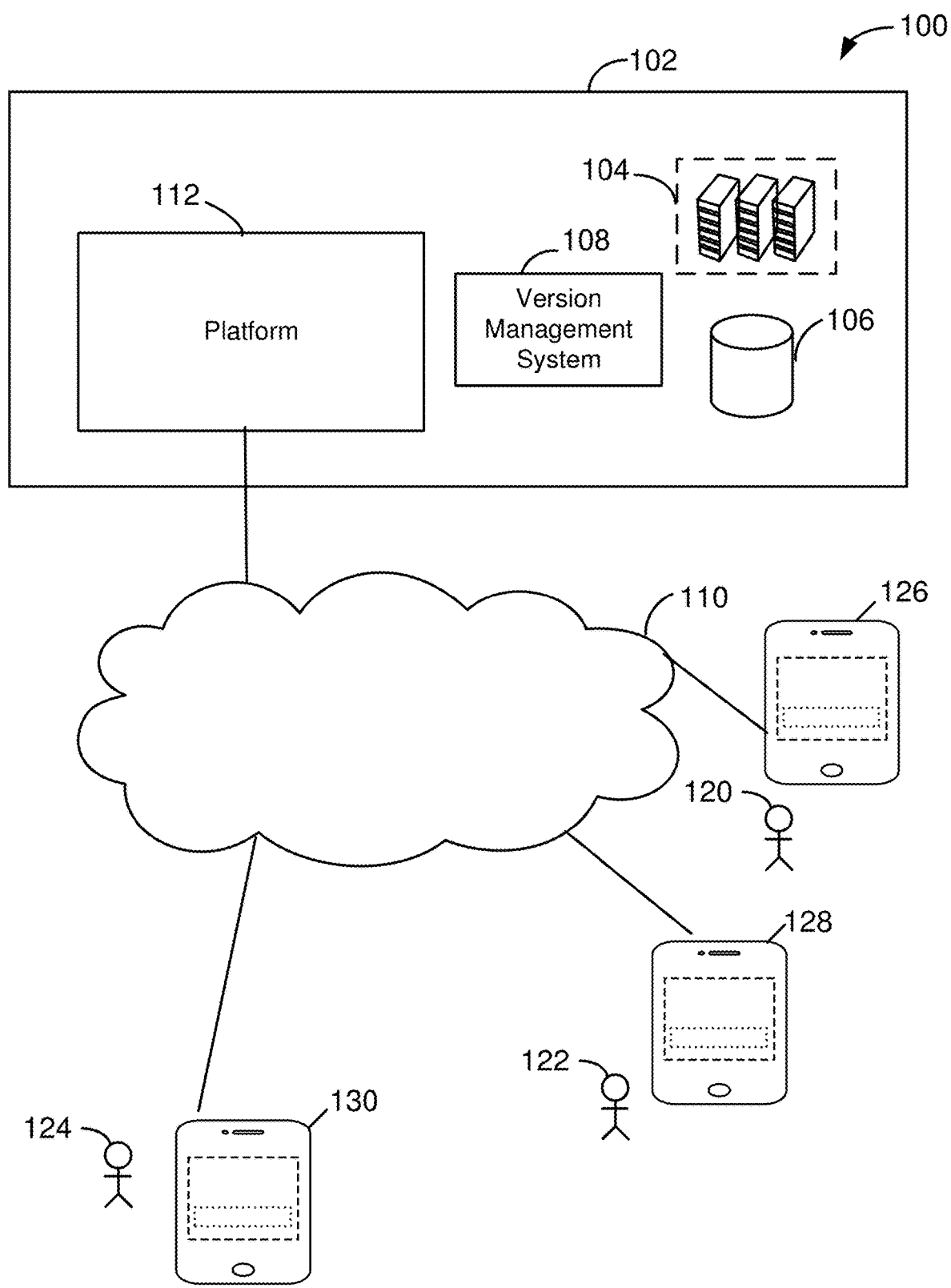
FIG. 1 shows a system diagram of an example of a system 100 in which a version control management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from the spirit and scope of the disclosure.

Some implementations of the disclosed systems, apparatus, methods and computer program products are configured for implementing version control for client devices. In some implementations, a database system implemented using a server system may control the versions of procedures that are stored by client devices. In addition, the server system may control the versions of procedures that are used by client devices during run-time.

When a software application such as a mobile application is developed, the software application is made available for installation on client devices. When the software application is updated, a new version is released for installation by the client devices. Generally, the expectation is that the new version of the software application will replace the prior version of the software application. Unfortunately, this limits the ability to implement different versions of an application across different populations and devices.

In some implementations, a server system is configured to select version(s) of a procedure for installation on one or more client devices. Specifically, the server system can select version(s) of a procedure based, at least in part, on a user profile of a user and transmit the selected version(s) to a client device of the user with a directive. The directive can instruct the client device to store the selected version(s) locally to a database stored at the client device and/or use the selected version(s) (e.g., when the procedure is called by an application).

In some implementations, the server system generates and transmits a message to the client device, where the message includes the name of the procedure, a version identifier identifying a selected version of the procedure, a set of computer-readable instructions corresponding to the selected version of the procedure, and a directive pertaining to the procedure. The directive can instruct the client device to store the version of the procedure as the current version being used by the client device. Alternatively, the directive can instruct the client device to store the version of the procedure without instructing the client device to use that version of the procedure.

In some implementations, the server system can control the number of versions of a procedure that are stored at a client device. This can be accomplished via a directive transmitted in conjunction with the procedure or independent from the procedure. For example, the server system can transmit a directive that instructs the client device to maintain a specified maximum number of versions of the procedure. Therefore, at any given time, a client device may store one or more versions of a procedure in its database.

In some implementations, the server system can transmit a directive to the client device that instructs the client device to recognize a particular version of a procedure as "active." In other words, the directive can instruct the client device to execute a particular version of the procedure in the event that the procedure is called via the procedure name. This can be useful, for example, during A/B testing or to revert to a previous version in the event of a bug. Therefore, a client device can be instructed to use any version of a procedure that it has received from the server system or has otherwise stored in its database.

Typically, a software application such as a mobile application installed on a mobile device implements logic that obtains and presents data via a user interface. More particularly, the logic can obtain the data from a local data store or can communicate over a network to retrieve the data and persist it to the local data store. Once obtained, the logic can provide the data for presentation via a graphical user interface.

The use of a local data store is two-fold, First, a local data store can provide immediate access to data, enabling data to be retrieved or updated in an efficient manner Second, a local data store enables the application to function offline in the event that network connectivity is not present.

The logic that is responsible for obtaining and rendering data may make multiple calls to the local data store to retrieve data to construct information for display. In some instances, these calls can be made to retrieve data from different tables. Furthermore, for some devices, each call to persist data to a data store or load data from a data store crosses a language boundary. Depending on the nature of the application, type of call, and size of data returned, this can negatively impact the user experience, particularly on devices with less optimal memory and performance. The net result of this may be degraded performance of the application, which may affect how much the product is used or how the product is rated.

In some implementations, the versions of the procedures that are transmitted to client devices are stored in the same database as the data being accessed and stored by the procedures. This enables the procedures to directly access the database. For example, Structured Query Language (SQL) calls can be embedded as part of the code. This approach eliminates the round trips often performed by the logic, resulting in faster data access Furthermore, if the database supports encryption, then both the data and code can be secured at rest.

In some implementations, a client device may store and execute various versions of procedures according to directives received from a server system. More particularly, at least one message received from a server system may be processed, where the message includes a procedure name of a procedure, an indication of a version of the procedure, a set of computer-readable instructions corresponding to the procedure, and a directive pertaining to the procedure. The procedure name and indication of the version of the procedure may be stored with the set of computer-readable instructions in a database table of a database according to the directive received from the server system. During execution of an application, the application may call the procedure via the procedure name. Data from one or more data objects stored in the database may be accessed by the procedure and provided for display via a graphical user interface (GUI).

In some implementations, the client device maintains a version table that indicates, for each procedure name in the version table, an "active" version of the procedure. When the procedure name is called, the active version of the procedure may be ascertained from the version table and the set of computer-readable instructions corresponding to the active version may be identified in the pertinent database table and executed. Data from data objects stored in the database may be accessed via the set of computer-readable instructions.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Any of the disclosed implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 shows a system diagram of an example of a system 100 in which a version control management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles, database records, and a database storing procedures including procedure names, version identifiers, and corresponding sets of computer-readable instructions.

System 102 includes a version management system 108 that facilitates database management. Version management system 108 is configured to facilitate version control of procedures stored and executed by client devices. More particularly, version management system 108 is configured to facilitate the transmission of procedures and associated directives to client devices. In some implementations, version management is facilitated via communication between version management system 108 and applications installed on the client devices. Version management system 108 can also maintain one or more client databases that track the versions of procedures that are stored at client devices, as well as track the versions of procedures that are active for various client devices and/or users. Client databases can include database(s) directly accessible by servers 104, as described herein. In some implementations, servers 104 cannot directly access a database stored in memory of a client device. Each database can include one or more database tables.

In some implementations, system 102 is configured to store user profiles/user accounts associated with users of system 102. Information maintained in a user profile of a user can include a client identifier such an Internet Protocol (IP) address or Media Access Control (MAC) address for client device(s) associated with the user. In addition, the information can include a unique user identifier such as an alpha-numerical identifier, the user's name, a user email address, and/or credentials of the user. Credentials of the user can include a username and password. The information can further include job related information such as a job title, role, group, department, organization, and/or experience level, as well as any associated permissions. In addition, the information can include client device information such as the device type, brand, model, and/or memory size. User profiles can be used by version management system 108 to select versions of procedures to be transmitted to client devices, as described herein. In some implementations, user profiles are further used to track the versions of procedures that are stored and/or active at client devices.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, users 120, 122, 124 of client computing devices 126, 128, 130 have accounts at salesforce.com®. By logging into their accounts, users 126, 128, 130 can access the various services and data provided by system 102. Examples of devices used by users include, but are not limited to, a desktop computer or portable electronic device such as a smartphone, a tablet, a laptop, a wearable device such as Google Glass®, an optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

Client devices 126, 128, 130 can communicate with system 102 to facilitate version management, as described herein. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Figure 2:
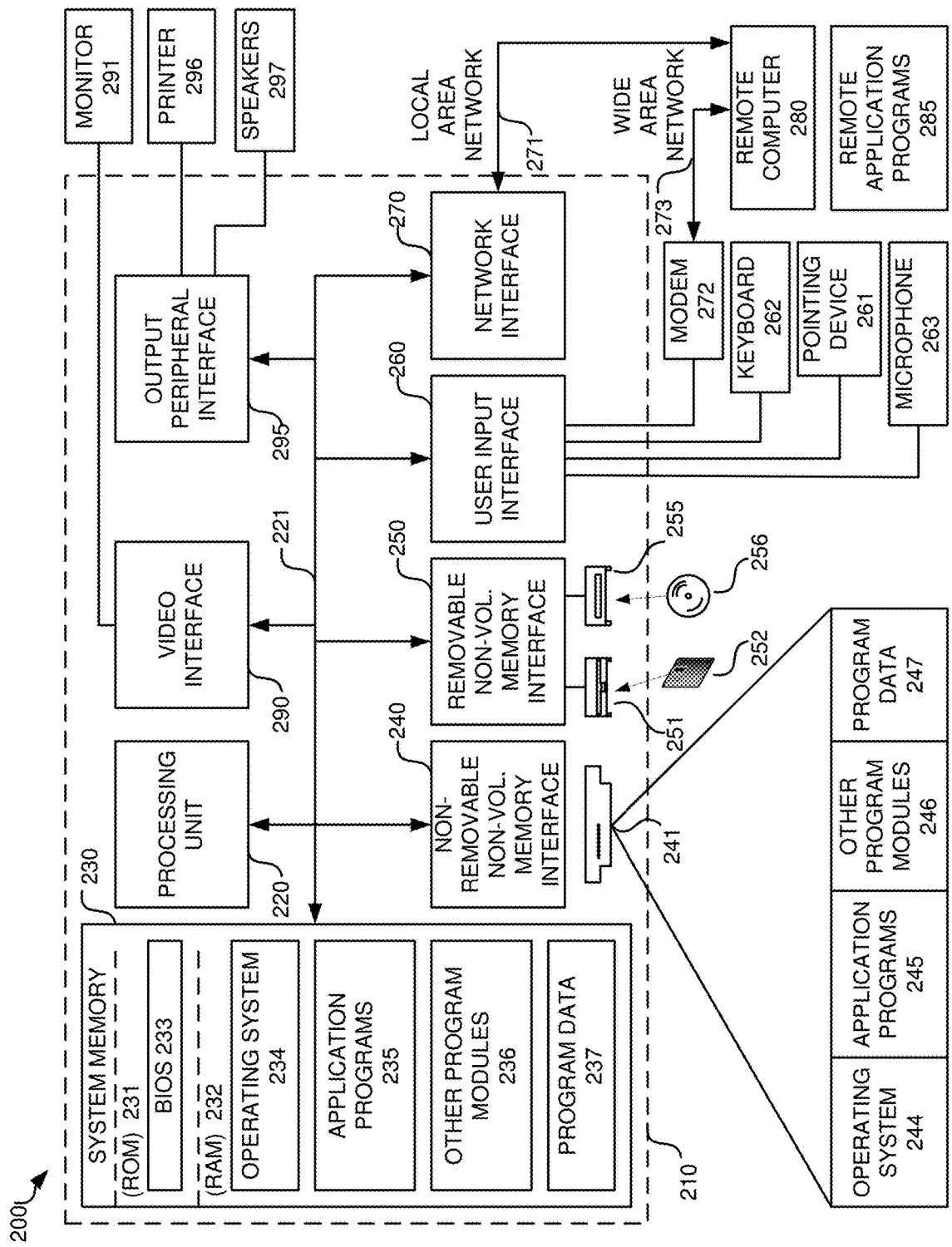
FIG. 2 is a diagram of an example computing system 200 that may be used with some implementations.

FIG. 2 is a diagram of an example computing system 200 that may be used with some implementations. In diagram 202, computing system 210 may be used by a user to establish a connection with a server computing system. For example, the user may use a browser associated the computing system 200 to access a website associated with an application deployed with a PaaS.

The computing system 210 is only one example of a suitable computing system, such as a mobile computing system, and is not intended to suggest any limitation as to the scope of use or functionality of the design. Neither should the computing system 210 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 210 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 2, the computing system 210 may include, but is not limited to, a processing unit 220 having one or more processing cores, a system memory 230, and a system bus 221 that couples with various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 210 typically includes a variety of computer program product. Computer program product can be any available media that can be accessed by computing system 210 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 210. Communication media typically embodies computer readable instructions, data structures, or program modules.

The system memory 230 may include computer storage media in the form of volatile and/or nonvolatile memory such as read only memory (ROM) 231 and random-access memory (RAM) 232. A basic input/output system (BIOS) 233, containing the basic routines that help to transfer information between elements within computing system 210, such as during start-up, is typically stored in ROM 231. RAM 232 typically contains data and/or program modules that are immediately accessible to and/or presently being operated on by processing unit 220. By way of example, and not limitation, FIG. 2 also illustrates operating system 234, application programs 235, other program modules 236, and program data 237.

The computing system 210 may also include other removable/non-removable volatile/nonvolatile computer storage media. By way of example only, FIG. 2 also illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 provide storage of computer readable instructions, data structures, program modules and other data for the computing system 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. The operating system 244, the application programs 245, the other program modules 246, and the program data 247 are given different numeric identification here to illustrate that, at a minimum, they are different copies.

A user may enter commands and information into the computing system 210 through input devices such as a keyboard 262, a microphone 263, and a pointing device 261, such as a mouse, trackball or touch pad or touch screen. Other input devices (not shown) may include a joystick, game pad, scanner, or the like. These and other input devices are often connected to the processing unit 220 through a user input interface 260 that is coupled with the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computing system 210 may operate in a networked environment using logical connections to one or more remote computers, such as a remote computer 280. The remote computer 280 may be a personal computer, a hand-held device, a server, a router, a network PC, a peer device or other common network node, and typically includes many or all the elements described above relative to the computing system 210. The logical connections depicted in FIG. 2 include a local area network (LAN) 271 and a wide area network (WAN) 273 but may also include other networks. Such networking environments are commonplace in offices, enterprise-wide computer networks, intranets and the Internet.

When used in a LAN networking environment, the computing system 210 may be connected to the LAN 271 through a network interface or adapter 270. When used in a WAN networking environment, the computing system 210 typically includes a modem 272 or other means for establishing communications over the WAN 273, such as the Internet. The modem 272, which may be internal or external, may be connected to the system bus 221 via the user-input interface 260, or other appropriate mechanism. In a networked environment, program modules depicted relative to the computing system 210, or portions thereof, may be stored in a remote memory storage device. By way of example, and not limitation, FIG. 2 illustrates remote application programs 285 as residing on remote computer 280. It will be appreciated that the network connections shown are exemplary and other means of establishing a communications link between the computers may be used.

It should be noted that some implementations may be carried out on a computing system such as that described with respect to FIG. 2. However, some implementations may be carried out on a server, a computer devoted to message handling, handheld devices, or on a distributed system in which different portions of the present design may be carried out on different parts of the distributed computing system.

Another device that may be coupled with the system bus 221 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 272 may employ a Wireless Application Protocol (WAP) to establish a wireless communication channel. The communication module 272 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

In accordance with various implementations, a server system of a database system communicates with a client device to facilitate version management. The client device can store versions of procedures received from the server system. In addition, the client device can track those versions of procedures that are "active." Example data structures that may be maintained by a client device to facilitate version control will be described in further detail below with reference to FIGS. 3A and 3B.

Figure 3A:
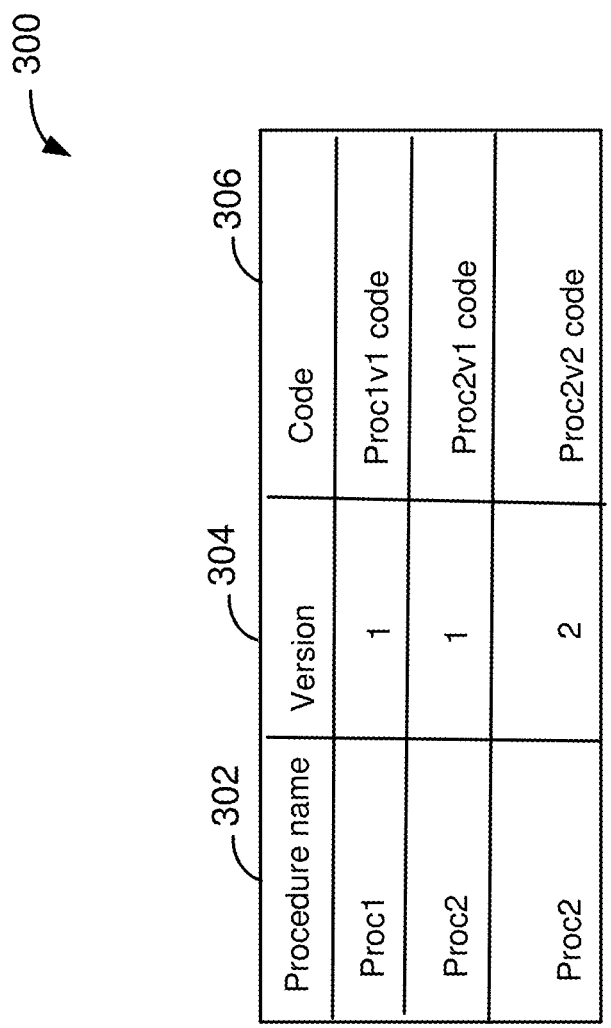
FIG. 3A shows an example of a database table 300 configured to store versions of procedures at a client device, in accordance with some implementations.

FIG. 3A shows an example of a database table 300 configured to store versions of procedures at a client device, in accordance with some implementations. Database table 300 may be configured to store computer-readable code for versions of procedures that is received from the server system. Specifically, each database record in database table 300 may correspond to a version of a procedure. In this example, database table 300 has three different columns corresponding to the different fields of a database record. More particularly, database table 300 is configured to store a procedure name 302, an indicator of a version (e.g., version identifier) 304, and computer code 306 including a set of computer-readable instructions associated with the corresponding version 304 of the procedure identified by the procedure name 302. Database table 300 may be stored in the same database(s) that stores data that is accessed or otherwise processed, during run-time, by the computer-code of the procedure(s). In other words, a procedure stored in database table 300 may be configured to access data in the database, which may include reading and/or writing to the database. Such a procedure may also be configured to process the data for presentation via user interface 306. As will be described in further detail below, the client device can retrieve or otherwise access computer code 306 by looking up a procedure name and version in database table 300.

In this example, database table 300 stores a single version of procedure Proc1. In addition, database table 300 stores two versions of procedure Proc2. While more than one version of a procedure may be stored at a given client device, version management may establish a single "active" version of that procedure for a given client device.

FIG. 3B shows an example of a database table 350 configured to track active versions of procedures at a client device, in accordance with some implementations. As shown in this example, database table 350 is a version tracking table that can identify or otherwise indicate an "active" version 354 for each procedure name 352 for which computer code is stored in database table 300. More particularly, database table 350 can include a database record for each procedure name. In this example, version 1 is active for procedures Proc1 and Proc2, while version 2 of Proc2 is inactive and therefore not identified in database table 350. Database table 350 may be stored in the same database(s) that stores data that is accessed or otherwise processed, during run-time, by the computer-code of the procedures.

During runtime, when a procedure is called using the corresponding procedure name, the client device can identify the active version of the procedure by looking up the procedure name in procedure name 352 column of database table 350. Upon ascertaining that version 1 of the procedure is active from active version 354 column, the client device can retrieve or otherwise access the computer code for the active version from database table 300.

Figure 4A:
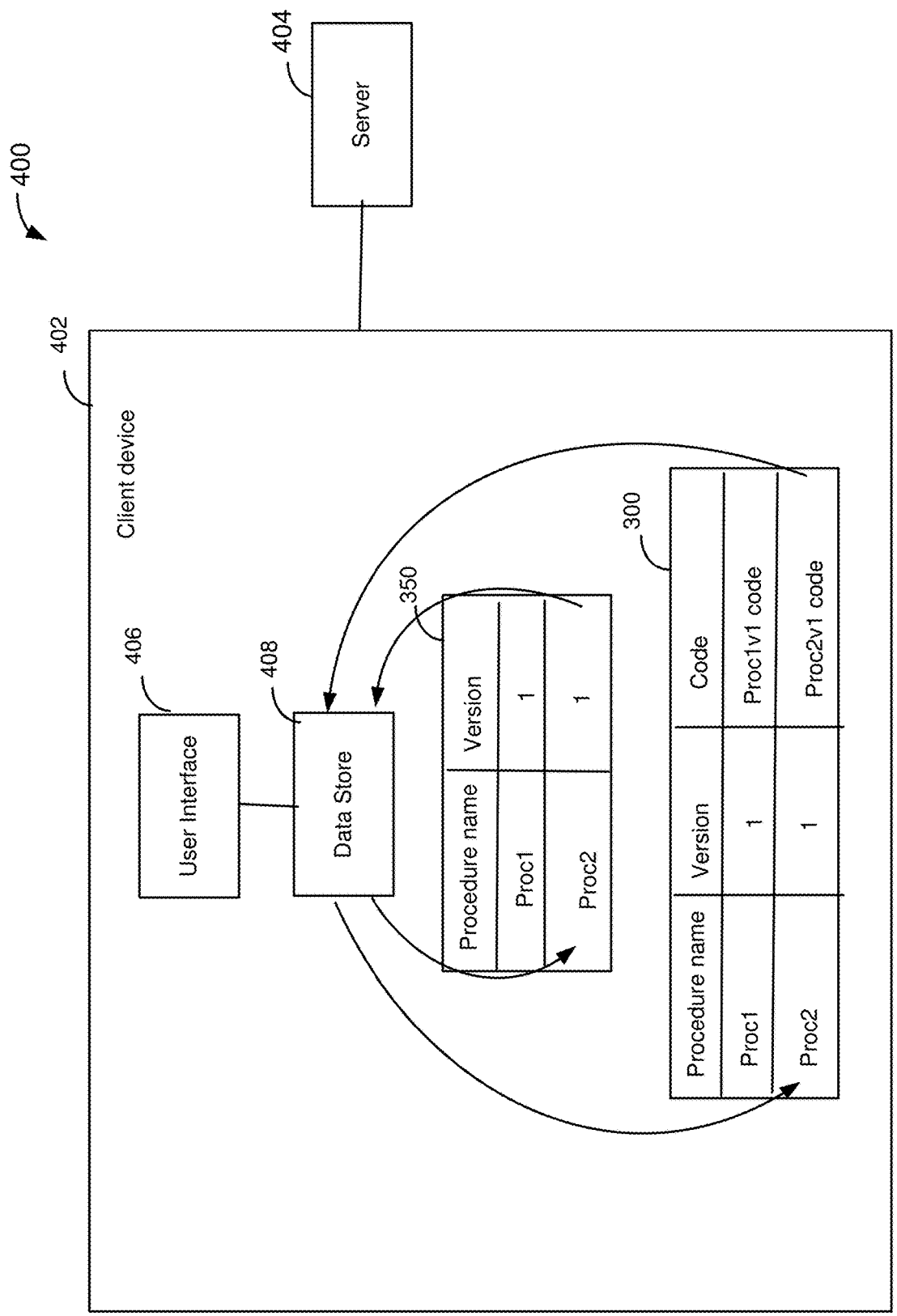
FIG. 4A shows a system diagram of an example of a system 400 including a client device configured to implement version control, according to some implementations.

FIG. 4A shows a system diagram of an example of a system 400 including a client device configured to implement version control, according to some implementations. In this example, system 400 includes client device 402 and server 404. Client device 402 may connect to server 404, as shown in this example. An application executing on client device 402 may access data to render via a user interface 406. More particularly, the application (e.g., an action in the user interface 406) may issue a call to a procedure that implements logic, as described herein. For example, the application may issue a call to procedure "Proc2."

When the procedure is called, client device 402 uses information stored in data store 408 to execute the procedure. In this example, data store 408 (e.g., RAM) of client device 402 stores database tables 300 and 350, as described above. Client device 402 looks up the procedure name in version tracking table 350 to identify the version of the procedure that should be used by client device 402. As shown in this example, client device 402 determines that version 1 of Proc2 is identified as the procedure to call. Client device 402 then accesses database table 300 to retrieve the computer-readable code for version 1 of Proc2. Client device 402 then executes the computer-readable code that has been retrieved for Proc2. The computer-readable code can access data stored in the database and renders the data via user interface 406.

Figure 4B:
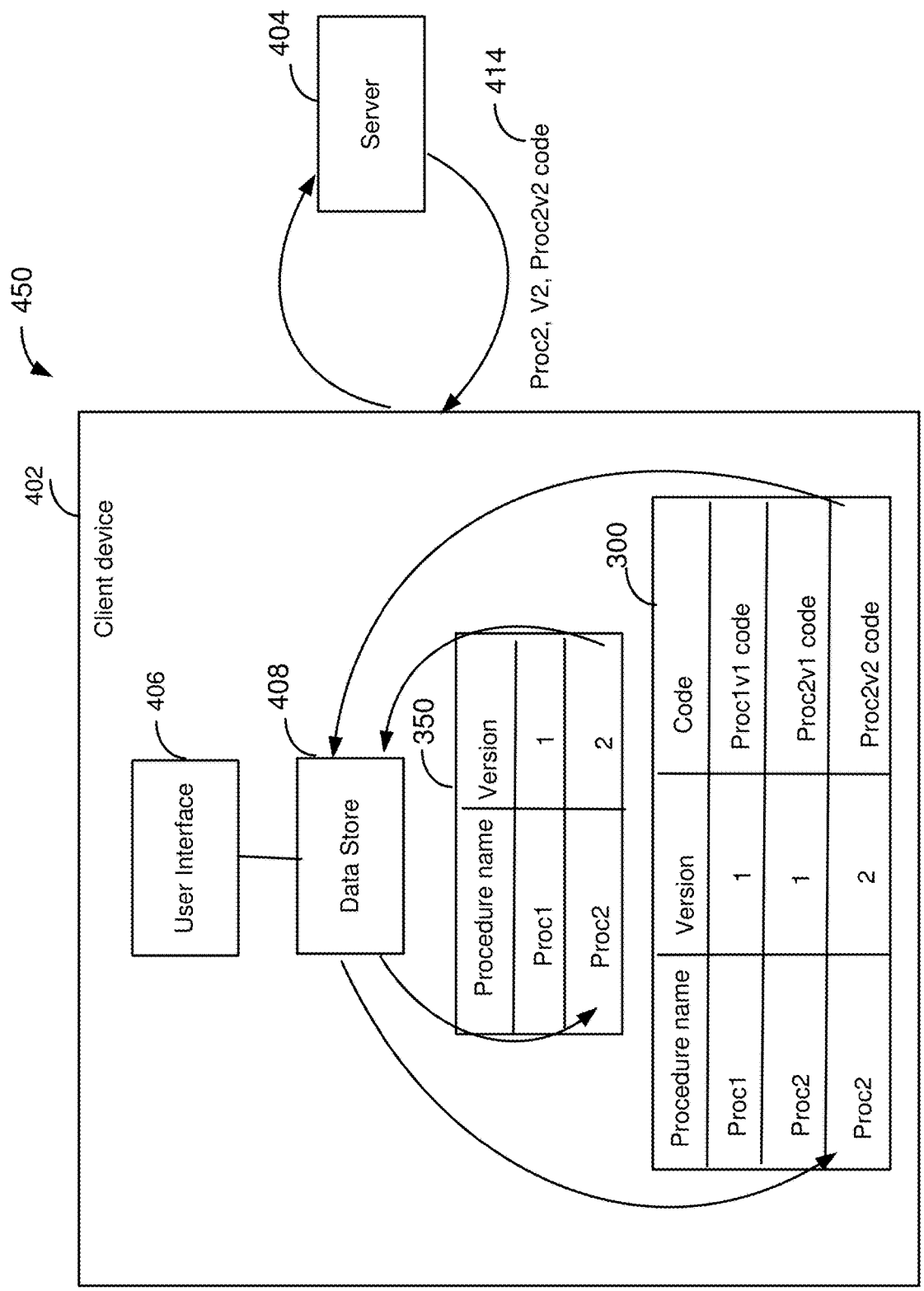
FIG. 4B shows a system diagram of an example of a system 450 including a client device configured to implement version control, according to some implementations.

FIG. 4B shows a system diagram of an example of a system 450 including a client device configured to implement version control, according to some implementations. At 414, server 404 sends version 2 of Proc2 to client device 402 with a directive instructing client device 402 to use version 2 of Proc2. More particularly, server 404 sends the name of the procedure (Proc2), a version identifier (version 2), and computer-readable code including a set of computer-readable instructions corresponding to the added version of the procedure. Client device 402 updates database table 300 to include an additional database record for version 2 of Proc2 so that the computer-readable code for version 2 of Proc2 is stored in database table 300. In addition, client device 402 updates version tracking table 350 to indicate that client device 402 is to use version 2 of Proc2.

As described above, an application executing on client device 402 may access data from data store 408 to render the data or information derived therefrom via user interface 406. In this example, the application (e.g., an action in the user interface 406) issues a call to procedure "Proc2." When the procedure is called, client device 402 uses information stored in data store 408 to execute the procedure. More particularly, client device 402 looks up the procedure name "Proc2" in version tracking table 350 to identify the version of the procedure that should be used by client device 402. Client device 402 determines that version 2 of Proc2 is the active version of the procedure, Proc2, to call. Client device 402 accesses table 300 to retrieve the computer-readable code for version 2 of Proc2. Client device 402 then executes the computer-readable code that has been retrieved for Proc2.

Figure 5A:
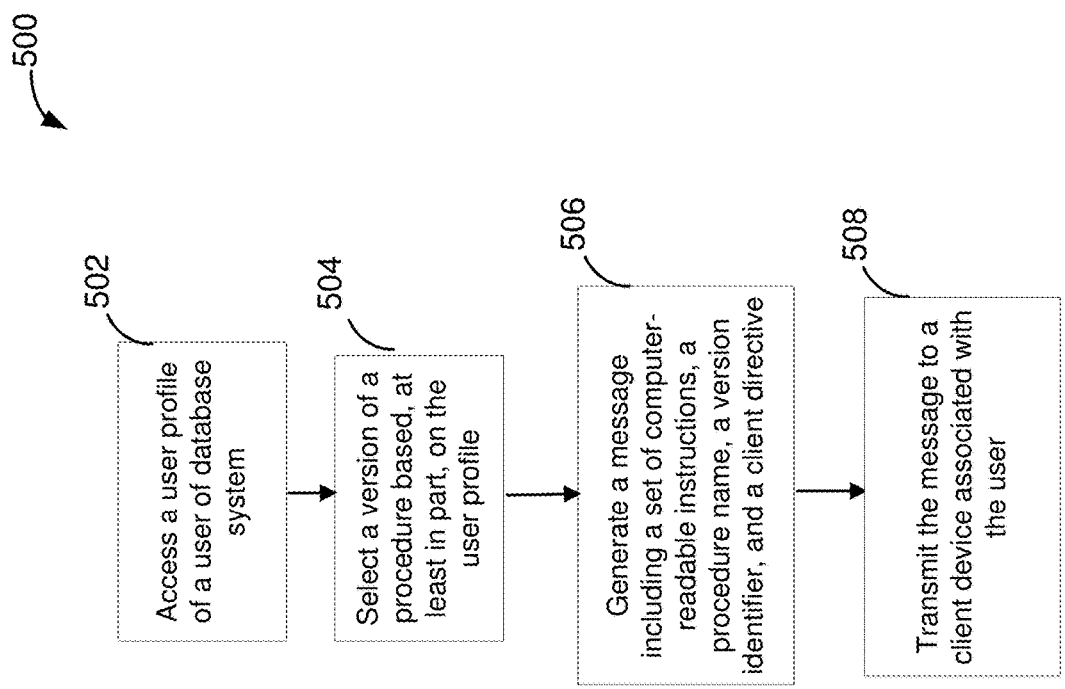
FIG. 5A shows process flow diagram 500 illustrating an example of a server process for facilitating version control for a client device, in accordance with some implementations.

FIG. 5A shows process flow diagram 500 illustrating an example of a server process for facilitating version control for a client device, in accordance with some implementations. As described herein, a server system of a database system may access a user profile of a user of the database system at 502. The server system may select one of two or more versions of a procedure based, at least in part, on the user profile at 504. For example, the server system may allocate version 1 to a first subset of the users of the database system and version 2 to a second subset of the users of the database system. The selection of version(s) of a procedure to transmit to a given client device may be based on characteristic(s) of a user of the client device and/or characteristic(s) of the client device.

The server system may generate a message at 506 for transmission to the client device. More particularly, the message may include a procedure name of the procedure, a version identifier identifying the selected version of the procedure, and a set of computer-readable instructions corresponding to the selected version of the procedure. In addition, the message may further include a client directive pertaining to storing the procedure in a database at the client device. The server system may transmit the message to the client device at 508.

The client directive may instruct the client device to store the computer-readable instructions in the database in association with the procedure name and version identifier. In some implementations, the client directive may indicate a particular version of the procedure to be used by the client device. In other words, the client directive may indicate a particular version of the procedure that is "active" for the client device. Therefore, the client directive may instruct a client device to store and use a particular version of a procedure.

In some implementations, the server system may transmit a second client directive to the client device, where the second client directive indicates a particular version of the procedure to be used by the client device. This "active" version may be the same version as that recently selected and transmitted to the client device. Alternatively, the active version may be a different version of the procedure from the recently selected version. For example, the server system may instruct the client device to revert to a prior version of the procedure.

In some implementations, the server system can transmit a client directive to the client device, where the client directive indicates a maximum quantity of versions of a procedure to be stored in the database. This maximum may apply to all procedures or a specific procedure name identified in the client directive. For example, the server system may establish a maximum of 3 versions for a procedure stored at the client device.

In some implementations, the server system may transmit a client directive that instructs the client device to discard a particular version of the procedure from its database. For example, where the version is ascertained to contain a bug, the server system may instruct client devices to delete that version and revert back to a prior version of the procedure.

The server system may maintain a record of the versions of procedures it has transmitted to each individual client device and/or the versions of the procedures currently stored at the corresponding client device. In addition, the server system may maintain a record of the active versions of procedures for the client devices. For example, the server system may update its information for a client device in the event that it sends a message pertaining to a version of a procedure to the client device. This update can include adding a version of a procedure to a list of procedures associated with a client device, removing a version of the procedure to the list of procedures associated with a client device, and/or updating the active version of a procedure for a client device. The server may also maintain a record of the maximum number of versions of a procedure that is permitted generally, for a particular procedure, or for a particular client device.

In some implementations, the server system may maintain a record of the number and/or identities of client devices that have received a particular version of a procedure. Similarly, the server system may maintain a record of the number and/or identities of client devices for which a particular version of a procedure is active. The server system may use this information to track the usage of various versions, errors that occur during the usage, and/or frequency with which various versions are used by users of the client devices. Using this information, the server system may test multiple versions of a procedure in parallel rather than providing a single version of a procedure across all client devices.

Figure 5B:
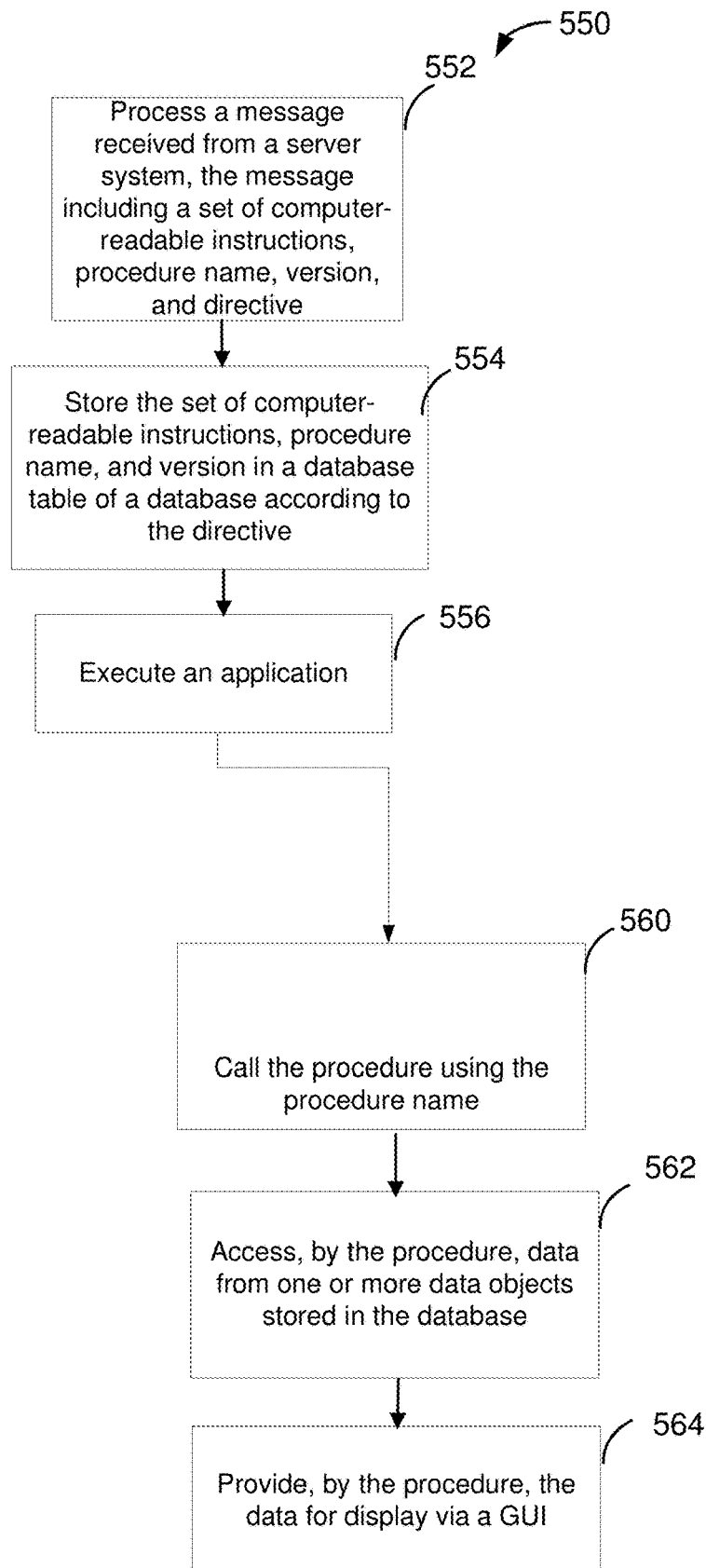
FIG. 5B shows a process flow diagram 550 illustrating an example of a process for implementing version control at a client device, in accordance with some implementations.

FIG. 5B shows a process flow diagram 550 illustrating an example of a process for implementing version control at a client device, in accordance with some implementations. As shown in this example, a client device may process at least one message received from a server system at 552, where the message includes computer-readable code configured to execute a particular version of a procedure. More particularly, the message may include a procedure name of a procedure, an indication of a version of the procedure, and a set of computer-readable instructions. In addition, the message may include a client directive pertaining to the procedure. The client directive can instruct the client device to store the version of the procedure it has received. In addition, the client directive can instruct the client device to use the version of the procedure during run-time (e.g., when the procedure is called by an application via the procedure name).

The client device may store, in a database table of a database stored in a memory of the client device, the set of computer-readable instructions in association with the procedure name and the indication of the version of the procedure at 554 according to the client directive received from the server system. More particularly, the client device may store the procedure name, the indication of the version of the procedure, and the set of computer-readable instructions in a record of a database table of a database stored in a memory of the client device. As described above, the database may also store data that can be accessed or otherwise processed by the set of computer-readable instructions during runtime.

In some implementations, the client device may store an indication that the version is the "active" version for the procedure identified by the procedure name. This information may be stored in a version tracking table or may be integrated with the table storing the computer code for the version of the procedure. The client device may update its information pertaining to active versions responsive to a client directive received from the server system. For example, the client directive may instruct the client device to store the version of the procedure and/or instruct the client device to use the version of the procedure. The client directive may be sent in conjunction with the message including the computer-readable code corresponding to the procedure. Alternatively, the client directive may be sent independent from (e.g., subsequent to) the message including the computer-readable code corresponding to the procedure.

In some implementations, the client device may assume that the version of the procedure it has received is the "active" version of the procedure for the client device. For example, the client device may assume that the version of the procedure is "active" if it is the only version of the procedure it has received from the server system. As another example, the client device may assume that the version of the procedure is "active" if it is the first version of the procedure it has received from the server system. Thus, the client device may add the version of the procedure to its version tracking table if a record corresponding to the procedure name is not already in the version tracking table.

The client device may execute an application at 556. For example, a user of the client device may initiate execution of the application. During execution of the application, the application may call the procedure using the procedure name at 560. When the procedure name is called, the client device may retrieve and execute the set of computer-readable instructions corresponding to the procedure name. In some implementations, the client device determines an active version of the procedure identified by the procedure name and retrieves the set of computer-readable instructions for the active version of the procedure. For example, the client device may ascertain the active version of the procedure by looking up the procedure name in a version tracking table. The client device may then look up the version of the procedure in a database table to retrieve the set of computer-readable instructions corresponding to the active version of the procedure. The client device may then execute the retrieved set of computer-readable instructions.

During run-time, the set of computer-readable instructions may access data from more data objects stored in the database at 562. For example, the set of computer-readable instructions may access data from a second database table in the database and provide the data for presentation via the client device at 564. For example, the set of computer-readable instructions may provide the data for display via a GUI. Alternatively, the set of computer-readable instructions may process the data to generate information that is presented via the client device and/or format the data for presentation via the client device.

In some implementations, the server system instructs the client device to maintain a maximum of a specified number of versions for a procedure. This maximum may be applied to all procedures or to a procedure identified by a particular procedure name. As new versions of a procedure are added, the client device may delete oldest, non-active versions of the procedure to ensure that the number of versions of the procedure do not exceed the maximum number.

In some implementations, the client device may receive a directive from the server system instructing the client device to delete a particular version of a procedure. In response, the client device can perform a lookup to identify that version of the procedure and delete the corresponding database record from the pertinent database table.

In the above-described examples, a single database message is generated and transmitted. However, these examples are merely illustrative. Therefore, any number of database messages can be transmitted to a client device to facilitate version control.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
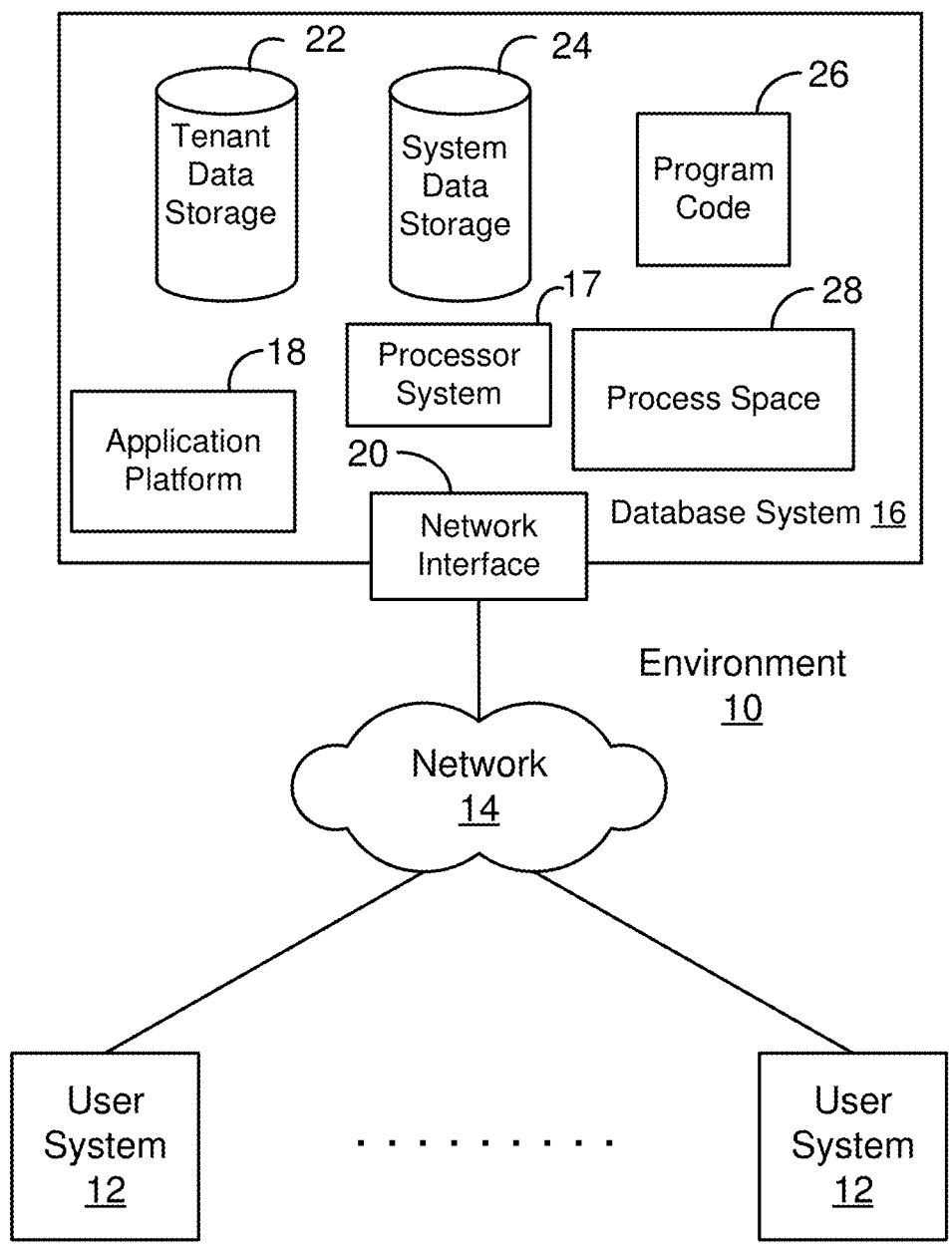
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
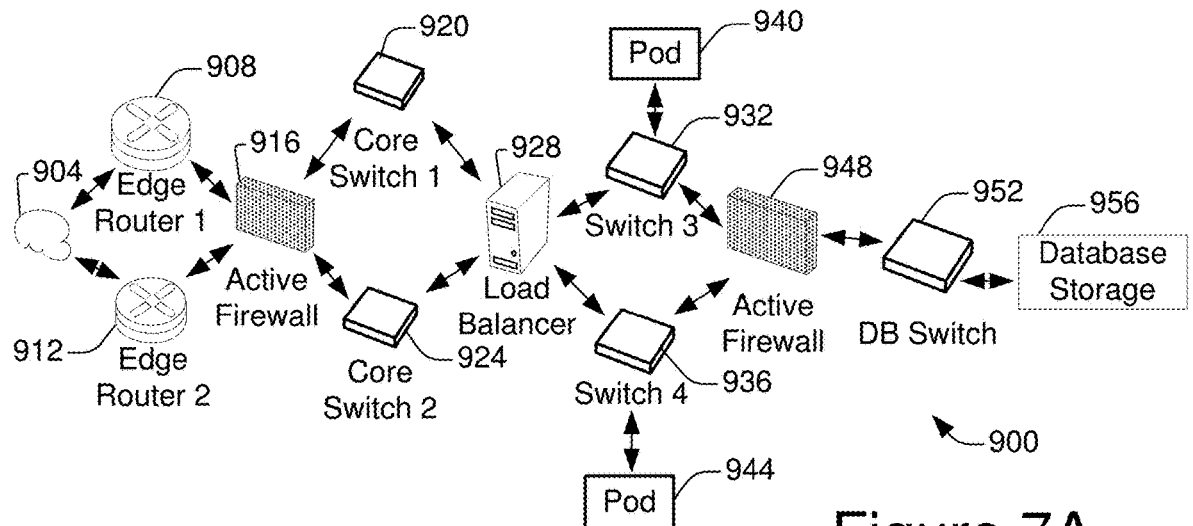
FIG. 7A shows a system diagram of an example of architectural components of an on-demand database service environment 900, in accordance with some implementations.
Figure 7B:
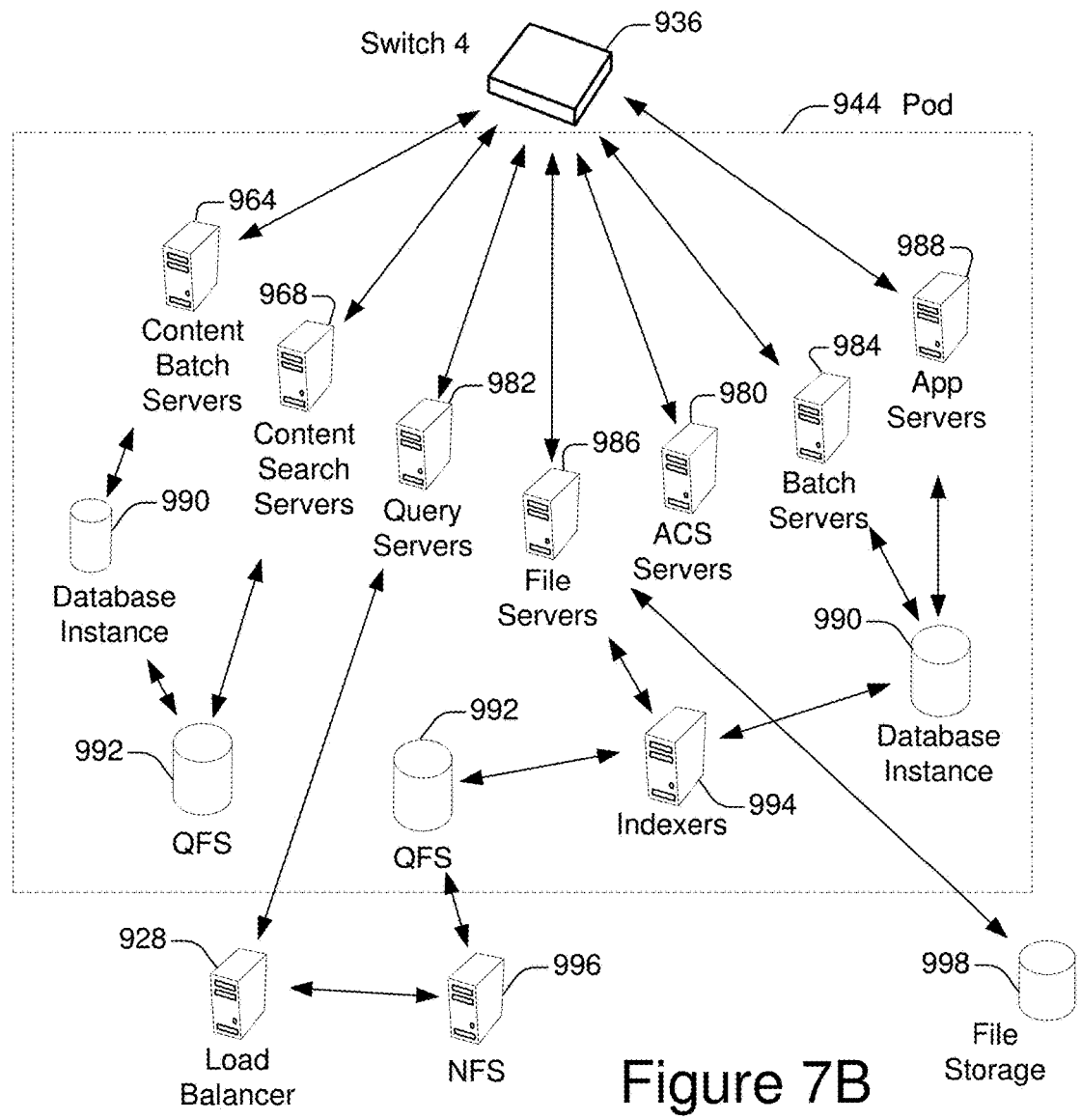
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
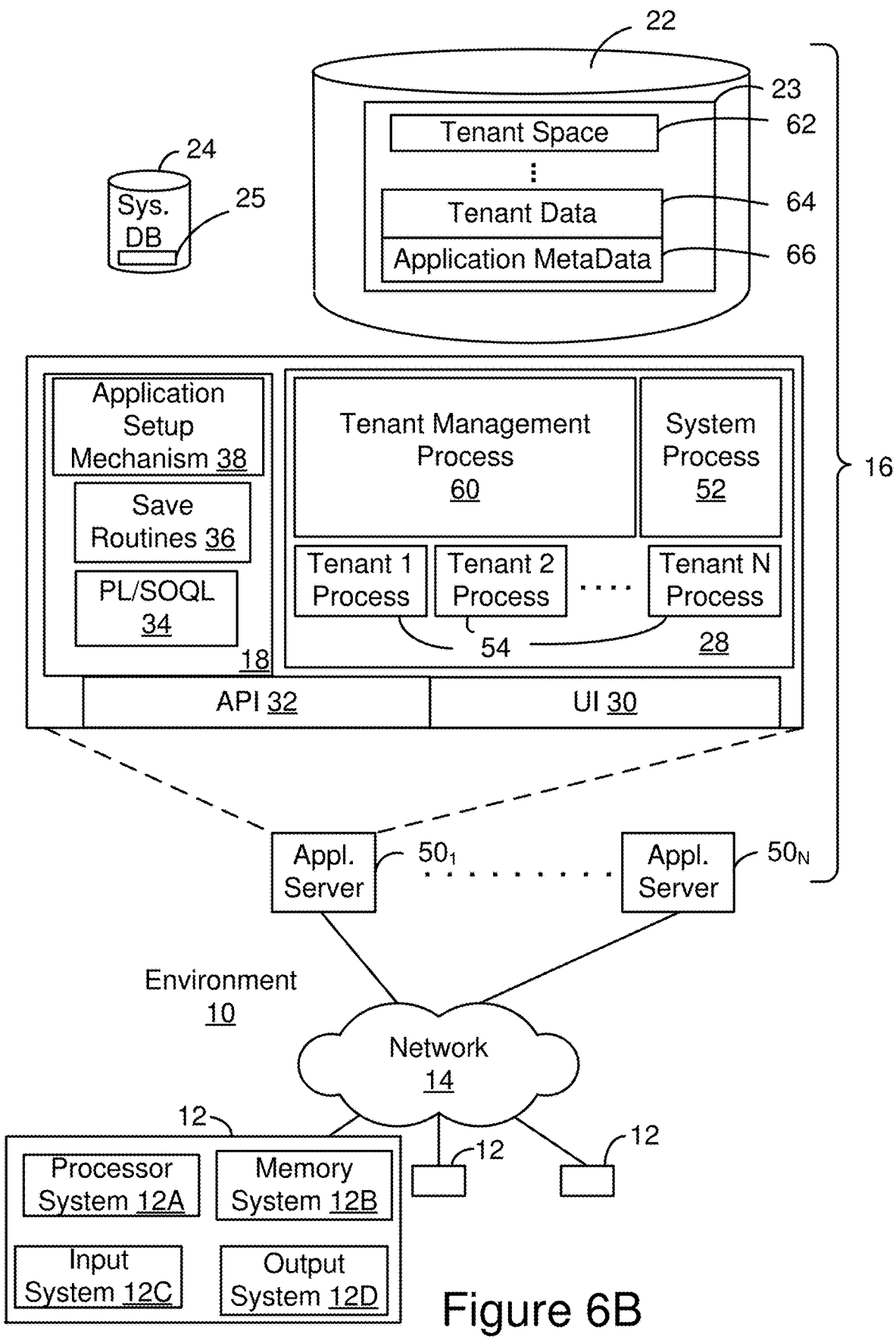
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988.

Also, the pod 944 includes database instances 990, quick file systems (QOS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system, the database system configurable to cause:
   identifying, through a user profile of a user of the database system, a characteristic of the user;
   identifying a characteristic of a client device of the user;
   selecting one of two or more versions of a procedure based, at least in part, on the user characteristic and on the client device characteristic;
   generating a message including:
      a set of computer-readable instructions corresponding to the selected version of the procedure,
      a procedure name of the procedure,
      a version identifier identifying the selected version of the procedure, and
      a client directive instructing the client device:
         how to store the selected version of the procedure in a database,
         how to use the selected version of the procedure, and
         to delete a particular previous version of the procedure detected to have a bug; and
   transmitting the message to the client device.

2. The system as recited in claim 1, the client directive instructing the client device to store the computer-readable instructions in the database in association with the procedure name and version identifier.

3. The system as recited in claim 1, the client directive indicating a particular version of the procedure to be used by the client device.

4. The system as recited in claim 1, the database system configurable to cause:
  transmitting a second client directive to the client device, the second client directive indicating a particular version of the procedure to be used by the client device.

5. The system as recited in claim 4, the particular version being the selected version.

6. The system as recited in claim 4, the particular version being different from the selected version.

7. The system as recited in claim 1, the client directive indicating a maximum quantity of versions of the procedure to be stored in the database.

8. A computer program product comprising computer-readable program code capable of being executed by one or more processors when retrieved from a non-transitory computer-readable medium, the program code comprising computer-readable instructions configurable to cause:
  identifying, through a user profile of a user of a database system, a characteristic of the user;
  identifying a characteristic of a client device of the user;
  selecting one of two or more versions of a procedure based, at least in part, on the user characteristic and on the client device characteristic;
  generating a message including:
    a set of computer-readable instructions corresponding to the selected version of the procedure,
    a procedure name of the procedure,
    a version identifier identifying the selected version of the procedure, and
    a client directive instructing the client device:
      how to store the selected version of the procedure in a database,
      how to use the selected version of the procedure, and
      to delete a particular previous version of the procedure detected to have a bug; and
  transmitting the message to the client device.

9. The computer program product as recited in claim 8, the client directive instructing the client device to store the computer-readable instructions in the database in association with the procedure name and version identifier.

10. The computer program product as recited in claim 8, the client directive indicating a particular version of the procedure to be used by the client device.

11. The computer program product as recited in claim 8, the computer-readable instructions further configurable to cause:
  transmitting a second client directive to the client device, the second client directive indicating a particular version of the procedure to be used by the client device.

12. The computer program product as recited in claim 11, the particular version being the selected version.

13. The computer program product as recited in claim 11, the particular version being different from the selected version.

14. The computer program product as recited in claim 8, the client directive indicating a maximum quantity of versions of the procedure to be stored in the database.

15. A method, comprising:
  identifying, through a user profile of a user of a database system, a characteristic of the user;
  identifying a characteristic of a client device of the user;
  selecting one of two or more versions of a procedure based, at least in part, on the user characteristic and on the client device characteristic;
  generating a message including:
    a set of computer-readable instructions corresponding to the selected version of the procedure,
    a procedure name of the procedure,
    a version identifier identifying the selected version of the procedure, and
    a client directive instructing the client device:
      how to store the selected version of the procedure in a database,
      how to use the selected version of the procedure, and
      to delete a particular previous version of the procedure detected to have a bug; and
  transmitting the message to the client device.

16. The method as recited in claim 15, the client directive instructing the client device to store the computer-readable instructions in the database in association with the procedure name and version identifier.

17. The method as recited in claim 15, the client directive indicating a particular version of the procedure to be used by the client device.

18. The method as recited in claim 15, further comprising:
  transmitting a second client directive to the client device, the second client directive indicating a particular version of the procedure to be used by the client device.

19. The method as recited in claim 18, the particular version being the selected version.

20. The method as recited in claim 18, the particular version being different from the selected version.

* * * * *